United States Patent [19]
Ichikawa et al.

[11] Patent Number: 5,942,168
[45] Date of Patent: *Aug. 24, 1999

[54] RESIN COMPOUND FOR MOLDING DIE, MOLDING DIE AND MATERIAL MOLDING BY THE MOLDING DIE

[75] Inventors: Yasuhiko Ichikawa, Itsukaichi-machi; Koji Sakane, Kobe; Yozaburo Tsujikawa, Naruto; Takio Tasaka, Tokushima, all of Japan

[73] Assignee: Otsuka Kagaku Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/507,300
[22] PCT Filed: Dec. 28, 1994
[86] PCT No.: PCT/JP94/02300
   § 371 Date: Oct. 10, 1995
   § 102(e) Date: Oct. 10, 1995
[87] PCT Pub. No.: WO95/18708
   PCT Pub. Date: Jul. 13, 1995

[30] Foreign Application Priority Data

Jan. 6, 1994 [JP] Japan .................................. 6-000319
Feb. 25, 1994 [JP] Japan .................................. 6-028365

[51] Int. Cl.$^6$ .................................................. B29C 33/38
[52] U.S. Cl. ..................... 264/40.1; 264/219; 264/328.1; 264/328.16; 264/335; 425/139; 425/144; 425/552; 425/556; 425/437; 524/401; 524/404; 524/423; 524/425; 524/451; 524/443
[58] Field of Search .................................. 264/40.1, 40.3, 264/40.6, 219, 328.1, 328.16, 335; 425/139, 143, 144, 175, 552, 556, 437; 249/134; 524/401, 404, 423, 425, 451, 443

[56] References Cited

U.S. PATENT DOCUMENTS

| 4,208,176 | 6/1980 | Salerno ................................... 425/139 |
| 4,626,564 | 12/1986 | Saito et al. . |
| 5,013,228 | 5/1991 | Thornthwaite et al. ................. 249/134 |
| 5,131,827 | 7/1992 | Tasaka ................................. 264/328.1 |
| 5,412,013 | 5/1995 | Watanabe et al. ....................... 524/413 |
| 5,474,853 | 12/1995 | Watanabe et al. ....................... 428/458 |

FOREIGN PATENT DOCUMENTS

| 112 018 | 6/1984 | European Pat. Off. . |
| 459 229 A2 | 5/1991 | European Pat. Off. . |
| 560 011 A1 | 1/1993 | European Pat. Off. . |
| 528 581 A1 | 2/1993 | European Pat. Off. . |
| 1779 748 | 4/1965 | Germany . |
| 51-119765 | 10/1976 | Japan . |
| 63273650 | 11/1988 | Japan . |
| 05124042 | 5/1993 | Japan . |
| WO 94/17140 | 8/1994 | WIPO . |

OTHER PUBLICATIONS

Abstract of European Patent No. 94–314373.
Abstract of European Patent No. 94–264066.
Abstract of European Patent No. 88–275354.

Primary Examiner—Jill L. Heitbank
Attorney, Agent, or Firm—Nikaido Marmelstein Murray & Oram, LLP

[57] ABSTRACT

A resin compound for a molding die, a molding die made of the resin compound, and a molding method using the molding die are disclosed. The resin compound includes thermoplastic resin, inorganic fiber reinforcing material and inorganic particle filler, has a flexural strength of 1000 kgf/cm$_2$ or more and a modulus of elasticity in bending of 70000 kgf/cm$^2$ or more, and allows machining. A deflection temperature under flexural load of the compound may be 180° C. or more. From this compound, it is possible to provide a core, a cavity block or the like of molding dies which can be accurately finished by machining finishing with a low cost and within a short term, have durability and allows recycling. The molding dies can be applied to various molding methods, and provide accurate molded products with a low cost.

14 Claims, 9 Drawing Sheets

RESIN COMPOUND FOR MOLDING DIE, MOLDING DIE AND MATERIAL MOLDING BY THE MOLDING DIE

TECHNICAL FIELD

The present invention relates to molding of a material such as resin, rubber compound and wax, and in particular to resin compound which can be used for manufacturing a die for molding such a material as well as the die made of such resin compound and a molding method for resin or the like with the die.

BACKGROUND ART

In accordance with reduction of a product cycle as well as a tendency of increasing the types of products and decreasing the quantity of products of each type, demands for inexpensive dies having a resin core and/or a resin cavity block which can comply with them have been increased in recent years. In the prior art, the resin core and/or resin cavity block are manufactured in such a manner that one prepare a master model of wood or the like which corresponds to a part or product to be molded, and using this model as an inner core, thermosetting resin such as epoxy resin or urethane resin is molded into an intended form by casting, defoaming and curing the same.

For manufacturing the dies having the resin core, cavity block or the like made of resin, the master model is essential. However, production of the master model requires a complicated work.

The thermosetting resin such as epoxy resin or urethane resin is used as the material for molding dies, because it is liquid in the room temperature and hence can be easily casted. However, in order to prevent mixing of bubbles during the casting, vacuum deaeration and curing take a long time, and cure shrinkage occurs, so that it is difficult to achieve an intended size accuracy. Further, even if one intends to recycle the resin core, cavity block and others of the die by pulverizing them after the use thereof, recycling of the used dies is impossible, because the property is deteriorated than intended property.

In order to overcome the problem relating to the recycle of the dies made of the thermosetting resin, it may be envisaged to prepare dies made of thermoplastic resin. In general, however, the thermoplastic resin has a very high viscosity, so that a pressure must be applied during casting, and the resin may not be supplied into a minute space even by the pressure, which make it impossible to reproduce a minute irregularity or the like on the master model.

Japanese Laid-Open Patent Publication No. 51-119765 (1976) discloses a die which is made of thermoplastic resin containing inorganic fibers such as glass fibers, or inorganic powder material such as calcium carbonate or river sand, and is used for contact-pressure molding of reinforced plastics. However, this die is manufactured by injection molding or compression molding, and requires a master model for forming the die.

For example, in the injection molding of resin, design of the product and design of the die have peculiarity distinguishing them from general part design. Thus, even if a designer completes the design of a product by determining numerical data of a specific configuration of the product and preparing the drawings, manufacturing of the resin product cannot be started immediately. When the product design is completed, it is then necessary to design the molding dies which are transferring tools for manufacturing the product.

Whenever the new design of the resin product is employed, new dies must be manufactured. Further, the products manufactured with the dies cannot be directly repaired or modified, so that the dies (particularly, their core and cavity block) are required to have an extremely high accuracy.

In the prior art, the dies are generally made of metal. However, manufacturing of the dies made of metal, which require an extremely high accuracy as described above, requires a huge cost and a long term, which significantly impedes development of resin products. In particular, a tendency of increasing the types of products and decreasing the quantity of products of each type in the present time, which is contrary to the tendency of manufacturing a large quantity of products of a few types in the past, results in significant increase in number of the dies required for trial, evaluation and final production. In the process of designing a new product, such a situation is inevitable that the design of the product and hence the design of the die must be changed for changing a configuration, improving a function and reducing a product cost. Therefore, it is strongly desired to reduce the cost for manufacturing the die. Moreover, the product cycle has been remarkably reduced, so that it is very important to reduce a term required for manufacturing the die.

In view of the above, there have been various proposals. For example, the metal die is made of steel having a good machinability. The materials and parts of dies are standardized. The dies have a cassette type structure, in which only portions forming a cavity block and a core are exchangeable. Computers are used to improve the efficiency in die designing.

According to all the above proposals, however, the core and cavity block of the dies are made of metal, as is done in the conventional technique, and sufficient improvement cannot be achieved.

Accordingly, it is an object of the invention to provide a resin compound for a molding die, which does not require a master model, and allows machining for finishing a core, a cavity block or the like of the dies having a good dimensional accuracy and a high durability with a low cost and within a short term.

Another object of the invention is to provide a molding die having a part such as a core or a cavity block made of resin which can be recycle by pulverization thereof.

Still another object of the invention is to provide a molding die, which allows machining for finishing a core, a cavity block or the like having a good dimensional accuracy and a high durability with a low cost and within a short term, and hence can be entirely manufactured with a low cost and within a short term while maintaining a required accuracy.

Yet another object of the invention is to provide a method of molding of material such as resin which can provide an accurate and inexpensive molded product.

DISCLOSURE OF THE INVENTION

The inventors have made research for achieving the above objects, and have found that a thermoplastic resin compound containing predetermined quantities of two kinds of inorganic materials has a high mechanical strength and a good machinability, and by using this compound, it is possible to manufacture a core, cavity block or the like having a high accuracy and a high durability only by machining with a low cost, within a short time and without requiring a master model, and to recycle the used core, cavity block or the like by pulverizing the same without substantially causing reduction of the strength and deterioration of the machinability.

For the purpose of allowing use of resin as a material of the cavity block and the core which require a particularly high manufacturing cost and a long manufacturing term in the conventional molding metal dies, and thereby reducing the cost and term for manufacturing the dies, the inventors have also made research to find that, by using the foregoing thermoplastic resin compound which has the good machinability and the high mechanical strength and has the specific quantities of the two specific kinds of inorganic materials, molded products such as square blocks can be easily formed, and the cavity block and core can be manufactured easily, accurately and inexpensively within a short term only by machining the same.

Although the cavity block and core made of the resin compound have a high mechanical strength, the mechanical strength can be further improved to allow continuous molding of resin products, e.g., by injection molding by holding each of the core and cavity block made of the resin compound with holding means serving also as reinforcing means. Reduction of the durability, which may be caused by using the resin for the core and cavity block, can be suppressed by providing means for cooling the same. These are also found by the inventors.

Based on the above research, the invention provides the following resin compound for a molding die, a molding die and others.

(1) Resin compound for a molding die which includes thermoplastic resin, inorganic fiber reinforcing material and inorganic particle filler, has a flexural strength of 1000 $kgf/cm^2$ or more and a modulus of elasticity in bending of 70000 $kgf/cm^2$ or more, and allows machining.

(2) A molding die having a core and a cavity block made of the resin compound for the molding die according to the above item (1).

(3) A molding method of performing material molding for forming a molded product using the molding die according to the above item (2).

(4) A molding die assembly including a core made of resin and a cavity block made of resin, core holding means for holding said core, cavity block holding means for holding said cavity block, temperature detecting means for detecting a temperature of at least one of said core and said cavity block, means for ejecting a cooling gas to said core and said cavity block, and a controller for controlling operation of said gas ejecting means in accordance with the temperature detected by said temperature detecting means so that the temperature detected by said temperature detecting means may satisfy a predetermined temperature condition, said core and said cavity block being formed of machinable thermoplastic resin compound including thermoplastic resin, inorganic fiber reinforcing material and inorganic particle filler, and having a flexural strength of 1000 $kgf/cm^2$ or more and a modulus of elasticity in bending of 70000 $kgf/cm^2$ or more.

(5) A molding die assembly including a core made of resin and a cavity block made of resin, core holding means for holding said core, and cavity block holding means for holding said cavity block, said core and said cavity block being formed of machinable thermoplastic resin compound including thermoplastic resin, inorganic fiber reinforcing material and inorganic particle filler, and having a flexural strength of 1000 $kgf/cm^2$ or more and a modulus of elasticity in bending of 70000 $kgf/cm^2$ or more, and said core and said cavity block each being provided with a heat radiation fin made of metal.

(6) A molding method performing material molding for producing a molded product using the molding die assembly according to the above item (4) or (5).

In any one of the above cases, the resin compound according to the invention for the molding die, and in particular for the core and cavity block essentially contains the thermoplastic resin, inorganic fiber reinforcing material and inorganic particle filler, has the flexural strength of 1000 $kgf/cm^2$ or more and the modulus of elasticity in bending of 70000 $kgf/cm^2$ or more, and allows machining. The compound may have a deflection temperature under flexural load of 180° C. or more so as to allow employment thereof for molding of resin material or the like having a relatively high melting point. The deflection temperature under flexural load may be lower than 180° C. if material such as wax having a low melting point is to be molded, or casting of thermosetting resin such as two-part curing epoxy resin or two-part curing urethane resin is to be performed.

Here, "machinable" means that cutting or machining by a general cutting machine such as a lathe, a drilling machine or a milling cutter can be carried out without significantly damaging a cutting tool. The "deflection temperature under flexural load" is a temperature at which the compound exhibits a predetermined deformation under a stress of 18.6 $kgf/cm^2$ according to the method prescribed in American Society for Testing Materials (ASTM) Standard D648. The above values of the flexural strength and modulus of elasticity in bending are measured according to the method prescribed by ASTM Standard D792.

The thermoplastic resin in the resin compound for the molding die according to the invention is the resin which can exhibit the above-mentioned mechanical strength and machinability when mixed with predetermined amounts of the inorganic fiber reinforcing material and inorganic particle filler which will be detailed later. Such thermoplastic resin can be easily selected based on an actual test, and specifically may be aromatic polyester such as polyphenylene ether, denatured polyphenylene ether blended with polystyrene, polyethylene terephthalate, polybutylene terephthalate or polybutylene naphthalate, polyphenylene sulfide, polyetherimide, polyether ether ketone, thermoplastic polyamide such as nylon 6, nylon 6·6, nylon 4·6, aromatic nylon or copolymer of aromatic nylon and nylon 6·6, polysulfone, polyaryl sulfone, polyether sulfone, or polythioether sulfone. Particularly, among them, polyphenylene sulfide, polyetherimide, polyether ether ketone, aromatic nylon, copolymer of aromatic nylon and nylon 6·6, polyether sulfone, and polythioether sulfone are preferable, because they have good resistance against the heat, chemical attack and oil, and further, polyphenylene sulfide, polyetherimide, polyether ether ketone, aromatic nylon, and copolymer of aromatic nylon and nylon 6·6 are particularly preferable because they have good resistance against water. only one kind of thermoplastic resin may be used, or two or more kinds of resin can be used. When using two or more kinds of thermoplastic resin having a difficulty in compatibility, known compatibilizer for improving the compatibility may be used.

The quantity of the thermoplastic resin may be appropriately selected from a wide range, and is generally in a range from 40 to 70 weight % with respect to the whole resin compound according to the invention. If it is significantly lower than 40 weight %, the compound may not exhibit sufficient moldability. If it significantly exceeds 70 weight %, the above strength cannot be achieved, which may result in deformation and/or breakage during molding.

In the resin compound for the molding die according to the invention, the inorganic fiber reinforcing material is used for achieving the flexural strength and modulus of elasticity in bending described above, and further, if necessary, for achieving an intended deflection temperature under flexural load (e.g., 180° C. or more), and is also used for ensuring the surface smoothness during machining. The inorganic fiber reinforcing material may be any one of known materials except for glass fibers, carbon fibers, rock fibers or the like, and specifically may be whiskers of fiber-like potassium titanate, fiber-like calcium silicate, fiber-like magnesium borate, fiber-like magnesium sulfate, fiber-like calcium sulfate, fiber-like calcium carbonate, fiber-like aluminum borate or the like. Among these whiskers, the potassium titanate whiskers are most preferable. Only one kind of whiskers may be used, or two or more kinds of whiskers may be used.

In connection with the inorganic fiber reinforcing material, the fiber diameter, aspect ratio and Mohs' hardness are not especially limited, but the average fiber diameter of 5 μm or less, the aspect ratio of 3 or more and the Mohs' hardness of 6 or less are preferable. If the inorganic fiber reinforcing material had an average fiber diameter significantly larger than 5 μm, the molded product made of the compound of the invention might not have a sufficient surface smoothness. If the aspect ratio were significantly smaller than 3, the intended flexural strength and modulus of elasticity in bending might not be achieved, and further the intended deflection temperature under flexural load (e.g., 180° C. or more) might not be achieved. If the Mohs' hardness was significantly larger than 6, the machinability might be impaired, resulting in damage against the cutting tool.

The quantity of the inorganic fiber reinforcing material is not especially restricted and can be appropriately selected from a wide range. It is generally in a range from 20 to 40 weight % with respect to the entire quantity of the resin compound of the invention. If it were significantly lower than 20 weight %, the intended strength might not be achieved. If it were significantly larger than 40 weight %, the compound of the invention might be fragile.

The inorganic particle filler in the resin compound for the molding die according to the invention is used for further improving the mechanical strength of the compound and the adhesivity with respect to the plating. In general, the molding die is metal-plated for improving the surface smoothness, durability and mold releasing property in some cases, so that good adhesivity with respect to the plating is desired. The inorganic particle filler may be a known material such as talc, calcium carbonate or calcium pyrophosphate. The material may be used alone or together with one or more different kinds of materials. The particle diameter of the inorganic particle filler is not especially restricted, but, in view of the surface smoothness after the machining, the average particle diameter is preferably about 20 μm or less, and is more preferably about 10 μm or less. The Mohs' hardness of the inorganic particle filler is not especially restricted, but is preferably about 6 or less. Similarly to the above case, if the Mohs' hardness were significantly larger than about 6, the machinability might be impaired, resulting in damage against the cutting tool.

The quantity of the inorganic particle filler is not especially restricted, and can be appropriately selected from a wide range. In general, it is in a range from 10 to 30 weight % with respect to the entire quantity of resin compound according to the invention. If it were significantly lower than 10 weight %, the plating adhesivity might not be achieved sufficiently. Meanwhile, if it were significantly larger than 30 weight %, the mechanical strength of the compound of the invention might be impaired.

A typical example of the resin compound for the molding dies (typically, for its core and cavity block) according to the invention includes:

a. 40–70 weight % of thermoplastic resin, b. 20–40 weight % of inorganic fiber reinforcing material having an average fiber diameter of 5 μm or less, an aspect ratio of 3 or more and a Mohs' hardness of 6 or less, and c. 10–30 weight % of inorganic particle filler having an average particle diameter of 20 μm or less and a Mohs' hardness of 6 or less; and have a flexural strength of 1000 kgf/cm$^2$ or more and a modulus of elasticity in bending of 70000 kgf/cm$^2$ or more as well as machinability.

Further, the compound typically may have a deflection temperature under flexural load of 180° C. or more measured according to the above measuring method.

The resin compound according to the invention described above may contain known resin additives such as thermal stabilizer, mold release agent and coloring agent of quantities not impairing the intended mechanical strength and machinability.

The resin compound according to the invention can be manufactured according to the known method, for example, by uniformly mixing the thermoplastic resin, inorganic fiber reinforcing material, inorganic particle filler and, if necessary, resin additives with a known blender such as a tumbler mixer and kneading them with a known melting kneader such as an extruder. The compound is generally formed into pellets.

The molding die according to the invention which is made by using the resin compound of the invention, and particularly its core and cavity block can be formed, for example, by melting the pellets of the compound, molding the same to form the molded members having intended shape and size in accordance with a general method such as extrusion, compression or injection, and directly machining the molded members to form the core and cavity block having an intended configuration.

The configuration of the molded product or member is not especially restricted, and may be, for example, a block such as a cube, a rectangular parallelepiped or a column. The size of the molded member may be appropriately selected from a wide range in accordance with the shape, size or the like of the final die to be manufactured, and, in the case of, e.g., a square block, it may generally be a flat plate having a thickness from about 30 to about 50 mm and a width from about 300 to about 1000 mm. This can be used as it is, or after cutting the same into blocks of about 300 mm in width and about 300 mm in length.

For machining the molded member, a general machining such as milling, reaming, grinding or laser work can be employed. Adhesion of the members can be performed by ultrasonic soldering or with adhesive. For example, repair can be performed with putty of epoxy adhesive containing fine powder of the compound.

In any of the molding dies according to the invention, the core and the cavity block made of the resin compound of the invention may be provided with an air-cooling or water-cooling passage for maintaining an appropriate temperature during the molding. The mating surfaces of the core and cavity block of the molding die of the invention may be provided with a packing groove fitted with a packing for preventing leakage of resin. The metal plating may be effected on the molding die of the invention.

Conventional methods can be employed when manufacturing the molded product with the molding dies having the core and cavity block formed of the resin compound for the molding die of the invention as set forth in the above item (2). For example, the molding die is assembled in a metal holder structure (mother die) for reinforcement and positioning, and the molding material is supplied into the same according to an appropriate molding method so that an intended molded product is formed. The molding method is not especially restricted, and may be selected from various known methods such as injection molding, casting and blow molding. The molding dies can be used also for wax molding.

The molding dies of the invention as set forth in the above item (4), i.e., molding dies including the means for detecting the temperature of the core and/or cavity block, the means for ejecting the cooling gas to the core and cavity block, and the controller thereof as well as the molding dies of the invention as set forth in the above item (5), i.e., the molding dies including the core and cavity block provided with the metal heat radiation fin are typically those used for injection molding, but likewise may be molding dies for the casting, blow molding, wax molding and others.

These molding dies, which include the core and cavity block made of the resin compound of the invention, the means for holding them, the means for detecting the temperature of the core and/or cavity block or the heat radiation fin formed at the core and cavity block, may have the same structure as the conventional molding dies such as a 2-plate die assembly, a die assembly provided with an ejection sleeve and/or a stripper plate, a 3-plate die assembly, a split die assembly (having an undercutting mechanism) and a inner thread die assembly.

In the molding die assembly of the invention including the means for ejecting the cooling gas to the core and cavity block, the means for ejecting the cooling gas, for example, may include a nozzle for ejecting the cooling gas toward the core and cavity block, and more desirably toward a hot portion thereof heated to a high temperature, a device for generating a pressurized cold air (e.g., about −10 to −55° C., and about 3 to 7 kgf/cm$^2$), and means for leading the pressurized cold air generated by the above generating device to the nozzle, may include a compressed air generating device instead of the pressurized cold air generating device if the molding conditions (time, temperature, pressure and others) are constant, or may include a water adding device which adds water to the compressed air supplied to the nozzle for spraying them. However, addition of water must be decided taking into account the rusting of the metal holder structure (mother die) for reinforcement and positioning.

The means for detecting the temperature of at least one of the core and the cavity block in the molding die assembly may be typically an infrared rays radiational thermometer which is highly responsive in an non-contact measuring, or may be a resistance thermometer, a thermocouple thermometer or the like. The infrared rays radiational thermometer is advantageous in view of repetition stability in temperature control and improvement of the molding efficiency. If the resistance thermometer or the thermocouple thermometer is used, there is formed an aperture, a groove or the like through which the thermometer is inserted toward a portion of the core or cavity block (e.g., portion near a gate of the injection molding core) of which temperature is to be measured. In addition to the above, a heat label (e.g., manufactured by Micron Co.,Ltd.) may be attached to a portion of which temperature is to be measured. Since the heat label does not require the aperture or groove at the core or cavity block, machining for the same is not required, and reduction of the strength which may be caused by the aperture or groove can be avoided. The heat label can be conveniently used when performing the molding as a preliminary experiment in a search or laboratory room, and is inexpensive.

The die assembly of the invention provided at the core and the cavity block with a metal heat-radiating fin is suitable for the molding performed as a preliminary experiment in a search or laboratory room. The fin may be made of material containing aluminum and (or) copper, in which case the required cooling time is longer than that by the pressurized cold air, but appropriate cooling can be performed for molding of resin material which may be deformed by rapid cooling. The core and the cavity block provided with the heat-radiating fin may be covered with metal plating of nickel, chrome or the like for improving heat transfer to the heat-radiation fin.

In the use of the molding die of the invention, the molding material is not especially restricted, and can be appropriately selected from a wide range. For example, it may be thermoplastic resin, thermosetting resin, rubber compound, wax for manufacturing a die for metal casting, or wax or low-melting point metal (i.e., metal or alloy of a melting point of about 140° C. and containing tin, bismuth or lead as a major component) to be set in the die for resin molding.

According to the resin compound for the molding die of the invention described above, it is possible to produce the molding die parts such as the core and cavity block, which have a good mechanical strength, allow easy machining such as cutting and are highly accurate and highly durable, only by the machining finish without a master model, with reduced cost and time as compared with the conventional simple processing.

By utilizing the resin compound, it is also possible to provide the molding dies which are provided with such core and cavity block made of resin that can be finished by machining with a high accuracy, have a high durability, are less expensive than the conventional ones.

In the structure that the resin compound forming the molding die contains the inorganic fiber reinforcing material having the average fiber diameter of 5 $\mu$m or less and the aspect ratio of 3 or more, since the inorganic fiber reinforcing material has more minute structure than conventional reinforcing materials such as glass fibers and carbon fibers, pulverization does not significantly impair the physical properties such as flexural strength, modulus of elasticity in bending and a deflection temperature under flexural load. Therefore, the molding die can be recycled by pulverizing thereof (and, if necessary, mixed with new material).

The molding die of the invention can be used for molding of various materials and various molding methods, and can provide accurate molded products with a low cost. As compared with the conventional molding dies including the core and cavity block made of metal, the die manufacturing cost and term can be reduced, change of design of the die can be allowed without difficulty, and the intended accuracy of the die can be achieved. In view of them, the molding die of the invention can be advantageously employed specially for manufacturing molded products of small quantity and for manufacturing molded products for samples or evaluating the molding die prior to final production.

Sufficient durability against the pressure and heat during the molding can be achieved by the molding die assembly, which includes the cavity block holding means and core holding means for holding the cavity block and core made of resin, and is adapted to eject the cooling air to the cavity block and the core or is provided with the heat radiation fin for them.

In the molding die assembly of the invention, if the deflection temperature under flexural load of the thermoplastic resin compound forming the core and cavity block is 180° C. or more, it can be used for molding resin or the like of a relatively high melting point.

In the molding die assembly of the invention if the cavity block and core are fixed to the cavity block holder and core holder by removable holding members, respectively, the cavity block and core can be removed easily, which improves the maintenance property. Further, the cavity block and core can be reduced in size and weight. Owing to prevention of rust, the cavity block and core can be stored easily, which reduces the space and cost for production thereof. Moreover, only the cavity block and core having different configuration and size can be exchanged in a cassette-like manner.

PREFERRED EMBODIMENTS OF THE INVENTION

Figure 1:
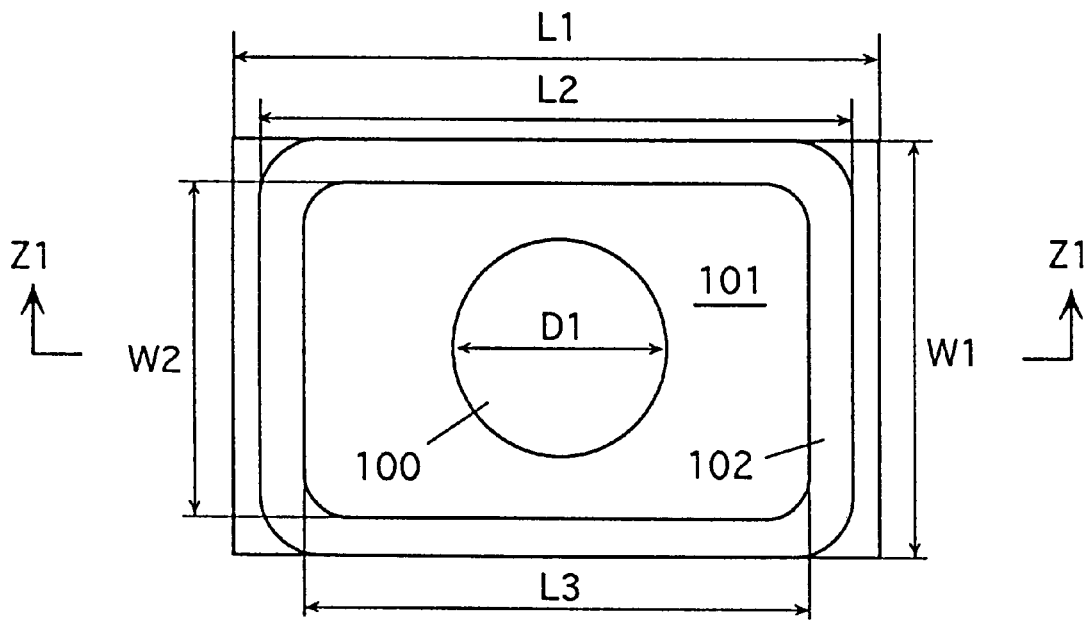
FIG. 1 is a plan showing a part produced by machining of a block of a resin compound according to the invention.

Embodiments of the invention will be described below for further clarifying the invention.

(Embodiments 1–3 and Examples for Comparison 1–3: resin compound for a molding die)

Polyphenylene sulfide (trade name: Fortron W300, manufactured by Polyplastic Co.,Ltd.), polyetherimide (trade name: Ultem 1010-1000, manufactured by GE Plastics Japan Ltd.), potassium titanate whiskers (trade name: Tismo N-102, average fiber diameter 0.4 $\mu$m, average fiber length 14 $\mu$m, aspect ratio 35, Mohs' hardness 4, manufactured by Otsuka Chemical Co.,Ltd.), and talc (trade name: Talc MS, average particle diameter 9 $\mu$m, Mohs' hardness 1, manufactured by Nippon Talc Co.,Ltd.) were prepared in accordance with a quantity ratio shown in Table 1, and then they were blended by a blender, were kneaded and extruded by a 45 mm extruder at a cylinder temperature of 330° C., and were cut by a cutter into pellets. The pellets thus produced were extruded by an extruder equipped with a die for sheet of 50 mm in thickness at a cylinder temperature of 330° C. to form a block of 50 mm in thickness, 300 mm in width and 300 mm in length. The block was evaluated in connection with the machinability and plating adhesivity by the following method.

[Machinability]

Machining Device: NC milling machine
(trade name: TK-150HVS, manufactured by Makino Milling Cutter Manufacturing Co., Ltd.)

Machining Tool: 2-blade A1-machining end mill of 3 mm in diameter and 6 mm in lead Spindle Speed: 3000 rpm Feed Speed: 200 mm/min Cutting Depth: 0.2 mm

[Plating Adhesivity]

The above block is machined to have a thickness of 3 mm, a width of 50 mm and a length of 50 mm.

Cleaning: 75° C., 10 minutes

Cleaning Liquid: Conditioner 1200 (trade name) manufactured by Shipley Far East Ltd.

Etching: 75° C., 20 minutes

Etching Liquid: liquid solution of $H_2SO_4:CrO_3=1:2$

Chemical Copper Plating: 15 minutes at room temperature

Chemical Copper Plating Liquid: Copper Mix 328L (trade name), manufactured by Shipley Far East Ltd.

Plating: Cr Plating

In order to determine basic physical properties of the above block, an ASTM test die assembly was used, and a test piece was injection-molded under the conditions of a cylinder temperature of 330° C., a die temperature of 120° C., an injection pressure of 1000 kgf/cm$^2$ and a maintained pressure of 500 kgf/cm$^2$, and the following physical properties were evaluated after leaving the piece in an air-conditioned room of 20° C. and 50% RH for 24 hours.

Test Piece: 6.4 mm in thickness, 12.7 mm in width

Flexural Strength and Modulus: ASTM D792, test speed=5 mm/min

Deflection Temperature under flexural load:

measured under ASTM D648 18.6 kgf/cm$^2$

The result is shown in Table 1.

TABLE 1

|  | Embodiment | | | Comparison Ex. | | |
| --- | --- | --- | --- | --- | --- | --- |
|  | 1 | 2 | 3 | 1 | 2 | 3 |
| QUANTITIES (wt %) | | | | | | |
| polyphenylene sulfide | 35 | 27.5 | 22 | 35 | 35 | 18 |
| polyetherimide | 35 | 27.5 | 22 | 35 | 35 | 18 |
| potassium titanate whisker | 20 | 30 | 36 | 30 | 10 | 50 |
| talc | 10 | 15 | 20 | — | 20 | 14 |
| PHYSICAL PROPERTIES | | | | | | |
| Flexural Strength (kgf/cm$^2$) | 1250 | 1400 | 1520 | 1650 | 1120 | D/P* |
| Modulus of Elasticity in Bending (kgf/cm$^2$) | 95000 | 130000 | 140000 | 106000 | 58000 | D/P* |
| Deflection Temp. under flexural load (° C.) | 205 | 215 | 230 | 215 | 176 | D/P* |
| Extrudability of Block | Good | Good | Good | Good | Good | D/P* |
| Machinability | Good | Good | Good | Good | Good | D/P* |
| Plate Adhesivity | Good | Good | Good | Bad | Good | D/P* |

D/P*: difficult to form pellets

According to Table 1, it can be seen that in the embodiments 1–3 (a) they have high flexural strength, modulus of elasticity in bending, deflection temperature under flexural load, and have low deformation of the molding die during injection-molding and (b) they have extremely good extrudability of the block, machinability and plating adhesivity.

Meanwhile, according to the example 1 for comparison not containing talc, the plating adhesivity is insufficient. According to the example 2 for comparison containing the whiskers at a ratio lower than 20 weight %, it has the low modulus of elasticity in bending of 58000 kgf/cm$^2$ and low deflection temperature under flexural load of 176° C., and which causes large deformation of the resin die during injection molding. According to the example 3 for comparison containing the whiskers at a ratio exceeding 40 weight %, it can be found that formation of pellets is difficult.

(Embodiment 4 and Examples 4 and 5 for Comparison: resin compound for a molding die)

Similarly to the embodiments 1–3, polyphenylene sulfide (trade name: Fortron W300), nylon 12 (trade name: DAI-AMID L1901, manufactured by Daicel-Huels Ltd.), cyclo olefin copolymer (trade name: Apel APL3500, manufactured by Mitsui Petrochemical Industries,Ltd.), and fiber calcium silicate (Wollastnite, trade name: Wicroll-10, average fiber diameter 4.5 μm, average fiber length 14 μm, aspect ratio 3, Mohs' hardness 4.5, manufactured by Partek Minerals Corp), and talc (Talc MS) were mixed as shown in Table 2 to form pellets, and a block and a test piece were produced from these pellets in accordance with the conditions shown in Table 2.

TABLE 2

|  | Embodiment | Comparison Ex. | |
| --- | --- | --- | --- |
|  | 4 | 4 | 5 |
| QUANTITIES (wt %) | | | |
| polyphenylene sulfide | 55 | — | — |
| nylon 12 | — | 55 | — |
| cyclo olefin copolymer | — | — | 55 |
| Wollastnite | 30 | 30 | 30 |
| talc | 15 | 15 | 15 |
| MOLDING CONDITIONS | | | |
| Kneading Tmp.(° C.) | 300 | 220 | 280 |
| Block Extrusion Tmp.(° C.) | 300 | 220 | 280 |
| Injection Molding Tmp.(° C.) | 300 | 220 | 280 |
| Die Tmp.(° C.) | 120 | 80 | 80 |
| Injection Pressure (kgf/cm$^2$) | 800 | 1000 | 1000 |
| Maintained Pressure (kgf/cm$^2$) | 400 | 500 | 600 |
| PHYSICAL PROPERTIES | | | |
| Flexural Strength (kgf/cm$^2$) | 1500 | 1200 | 1100 |
| Modulus of Elasticity in Bending (kgf/cm$^2$) | 115000 | 53000 | 55000 |
| Deflection Temp. under flexural load (° C.) | 230 | 155 | 170 |
| Extrudability of Block | Good | Good | Good |
| Machinability | Good | Bad | a little Bad |

From Table 2, it can be found that, even if the material contains the components at the predetermined ratio, the intended mechanical strength and machinability may not be achieved, which depends on the type of the thermoplastic resin.

(Embodiment 5: molding die)

In order to produce a box-like molded product of 26 mm in width, 55 mm in length, 18 mm in depth and 1.5 mm in wall thickness, the block of 50 mm in thickness, 300 mm in width and 300 mm in length formed in the embodiment 1 was machined by an NC machine to form the core and cavity block of molding dies (core portion and cavity portion have split structure). Each of the core and cavity block was attached to a mother die (holding structure made of metal), and they were mounted on an injection molding machine (trade name: SG50, mold clamping force 50 tons, manufactured by Sumitomo Juki Kogyo Co.,Ltd.), and the box-like products of polyacetal (trade name: Tenac LA501, manufactured by Asahi Chemical Industry Co.,Ltd.) and ABS resin (trade name: Cycolac GSM450, manufactured by Ube Cycon,Ltd.) were molded by the molding machine. The injection molding conditions are shown in Table 3.

TABLE 3

|  | Molded Material | |
| --- | --- | --- |
|  | polyacetal | ABS resin |
| Injection Pressure (kgf/cm$^2$) | 860 | 1290 |
| Maintained Pressure (kgf/cm$^2$) | 645 | 1075 |
| Injection Time (sec) | 2.0 | 1.6 |
| Cooling Time (sec) | 15 | 25 |
| Die Clamping Force (ton) | 20 | 20 |
| Cylinder Temperature (° C.) | | |
| nozzle | 175 | 230 |
| front | 180 | 235 |
| middle | 175 | 230 |
| rear | 165 | 200 |

Molding of polyacetal was performed in such a manner that, after performing the molding several shots for adjusting the injection condition, molding was continuously performed 50 times. No deformation and breakage occurred in the molding die, and the good molded products could be obtained, and any unacceptable product was not produced.

In connection with the molding of ABS resin, the molding was performed 40 times. Failure in release from the die did not occur, and good molded products were obtained.
(Embodiment 6: recycling of a molding die)

After injection molding of the box-like products made of polyacetal and ABS resin in the embodiment 5, the molding die was pulverized into pieces of about 5 mm or less in length by a pulverizer. Test pieces were produced by injection molding from 100 weight % of the pulverized pieces (No. 1 in Table 4) and mixture (No. 2 in Table 4) of 50 weight part of the pulverized pieces and 50 weight part of the pellets in the embodiment 1. Basic physical property measured from the test pieces are shown in Table 4. The conditions for injection-molding the test pieces and measuring methods of the physical property are the same as those in the embodiment 1.

TABLE 4

|  | No.1 (pulverized) | No.2 (mixed) | No.3 (virgin) |
| --- | --- | --- | --- |
| Flexural Strength (kgf/cm$^2$) | 1180 | 1230 | 1250 |
| Modulus of Elasticity in Bending (kgf/cm$^2$) | 93500 | 95000 | 95000 |
| Deflection Temp. under flexural load(° C.) | 200 | 205 | 205 |

From Table 4, it can be seen that No. 1 (pulverized pieces 100%) can sufficiently provide the flexural strength, modulus of elasticity in bending and deflection temperature under flexural load intended in the invention, and that No. 2 (pulverized pieces:virgin material=1:1) can provide the flexural strength, modulus of elasticity in bending and deflection temperature under flexural load similar to those of the virgin material. Therefore, it is apparent that the molding die of the invention can be recycled.
(Embodiment 7: machinability of resin compound for a molding die)

Figure 2:
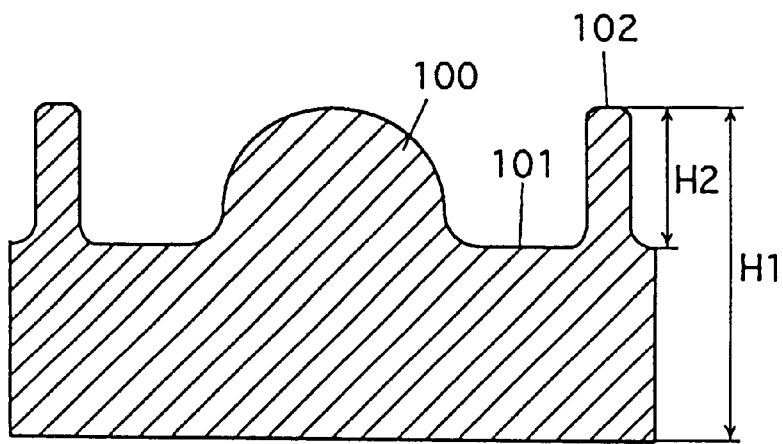
FIG. 2 is a cross section of the part taken along line Z1—Z1 in FIG. 1.

The block was produced from the resin compound containing materials in the embodiment 2 as shown in the table 1 in accordance with the steps similar to those in the embodiment2. The block thus produced was machined into a square piece of 80 mm×50 mm×40 mm. This square piece was machined in accordance with the condition described in the following table 5 by a machine and tools described below to form a part having a configuration shown in FIGS. 1 and 2. This part has a hemispherical portion 100 at its upper central position, around which an outer peripheral wall 102 is formed with a pocket portion 101 therebetween. Inner and outer edges of the top of the wall 102 are rounded. The respective portions shown in the figures have the following sizes.

L1=80 mm, L2=70 mm, L3=60 mm, W1=50 mm, W2=40 mm, H1=40 mm, H2=12 mm, D1=24 mm

The machining process took only 30 minutes. For rough machining and removing chips, soluble cutting oil (trade name: Castrol Highsol X, manufactured by U. K. Castrol Co., Ltd.) was used.

Cutting Machine: vertical high-speed machining center FX-5

Control Unit: Matsuura System M80

Spindle Speed: 30000 rpm

High-speed Control Function: C-type cornering

The cutting machine and the control unit are manufactured by Matsuura Kikai Seisakusho.

Tool: R1.5 ball end mill (CS coating, manufactured by Hitachi Tool Co., Ltd.)
    tool holder BT40-CTH10-90 (manufactured by MTS Corp.)

TABLE 5

|  | Feed Speed (mm/min) | Accuracy | Pick mm | Spindle rpm |
| --- | --- | --- | --- | --- |
| Rough Finish | | | | |
| Pocket | 5000 | 30.0 | 3.0 | 30000 |
| Sphere | 500–3000 | 20.0 | 0.2 | 30000 |
| Semi-Finish | | | | |
| Outer Wall, Pocket Finish | 3000 | 4.0 | 0.2 | 30000 |
| Outer Wall, Pocket | 1000 | 4.0 | 0.1 | 30000 |
| Sphere | 500–3000 | 4.0 | 0.1 | 30000 |

In Table 5, "Accuracy" means a specified tolerance value, "Pick" means an amount by which the feed speed can be automatically reduced in accordance with the configuration of a portion to be machined and the accuracy.

The part produced by machining had a good smoothness at the spherical portion and the pocket portion, and did not require polishing. The surface roughness (center line average roughness Ra) at the pocket portion of the part was measured with Surfcom 300B (manufactured by Tokyo Seimitsu Co., Ltd.) to find that Ra at an end machined surface was 0.16 μm and Ra at the side machined surface was 0.48 μm, by which the good surface smoothness was confirmed. Similar high-speed machining was performed on a square piece made of compound containing, instead of potassium titanate whiskers, glass fibers of the same quantity, in which case the cutting tool was significantly damaged and the operation could not be completed. Also, a large amount of glass powder were dispersed, so that the working environment was remarkably impaired. Although machining of this square piece for comparison was allowed by reducing a spindle speed, it could not provide intended accuracy and surface smoothness of the machined surface.

From the foregoing, it is apparent that the compound of the invention has a good machinability.

Further examples of the molding die according to the invention will be described below with reference to FIGS. 3 and 4.

Figure 3:
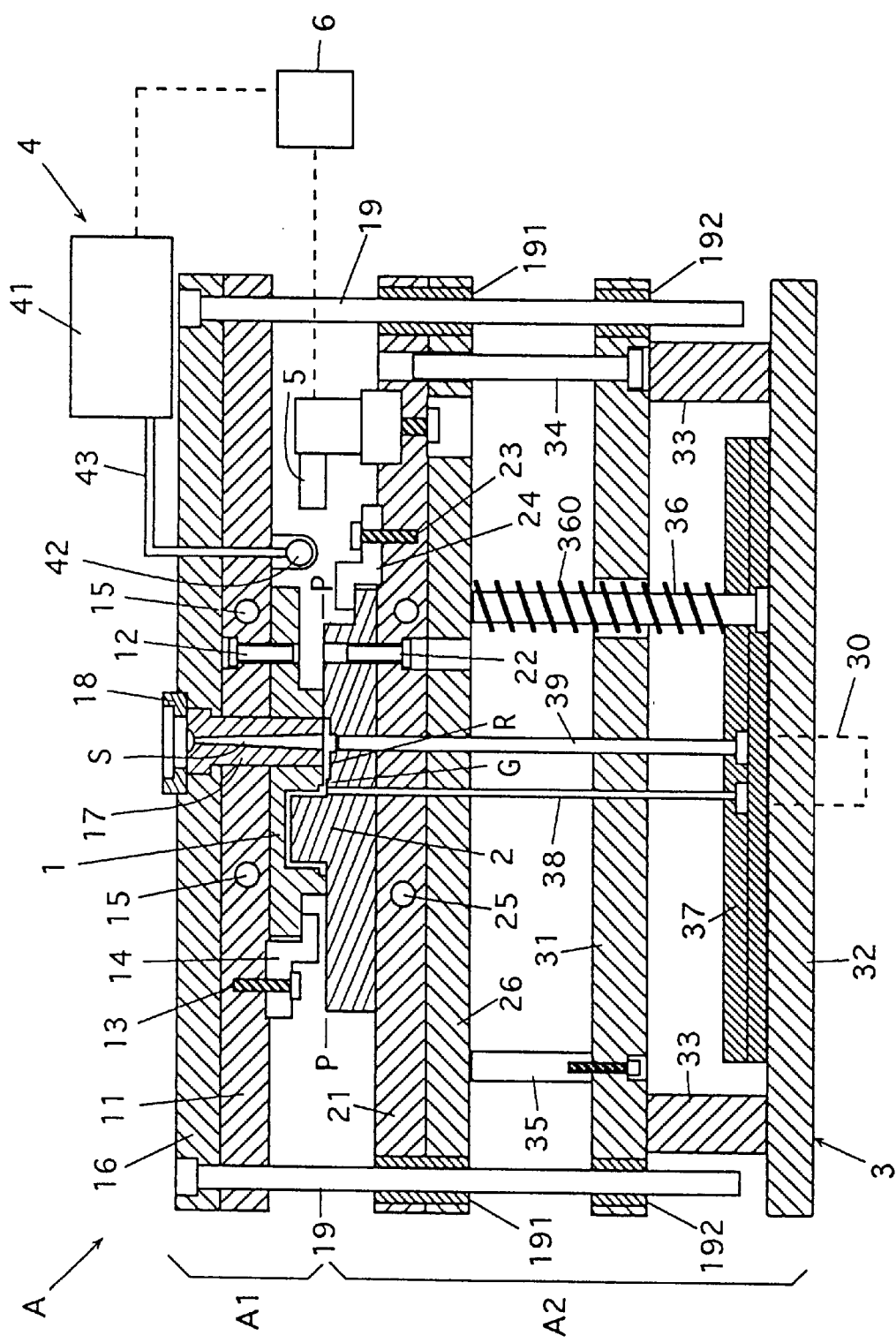
FIG. 3 is a cross section of an example of a molding die assembly according to the invention.
Figure 4:
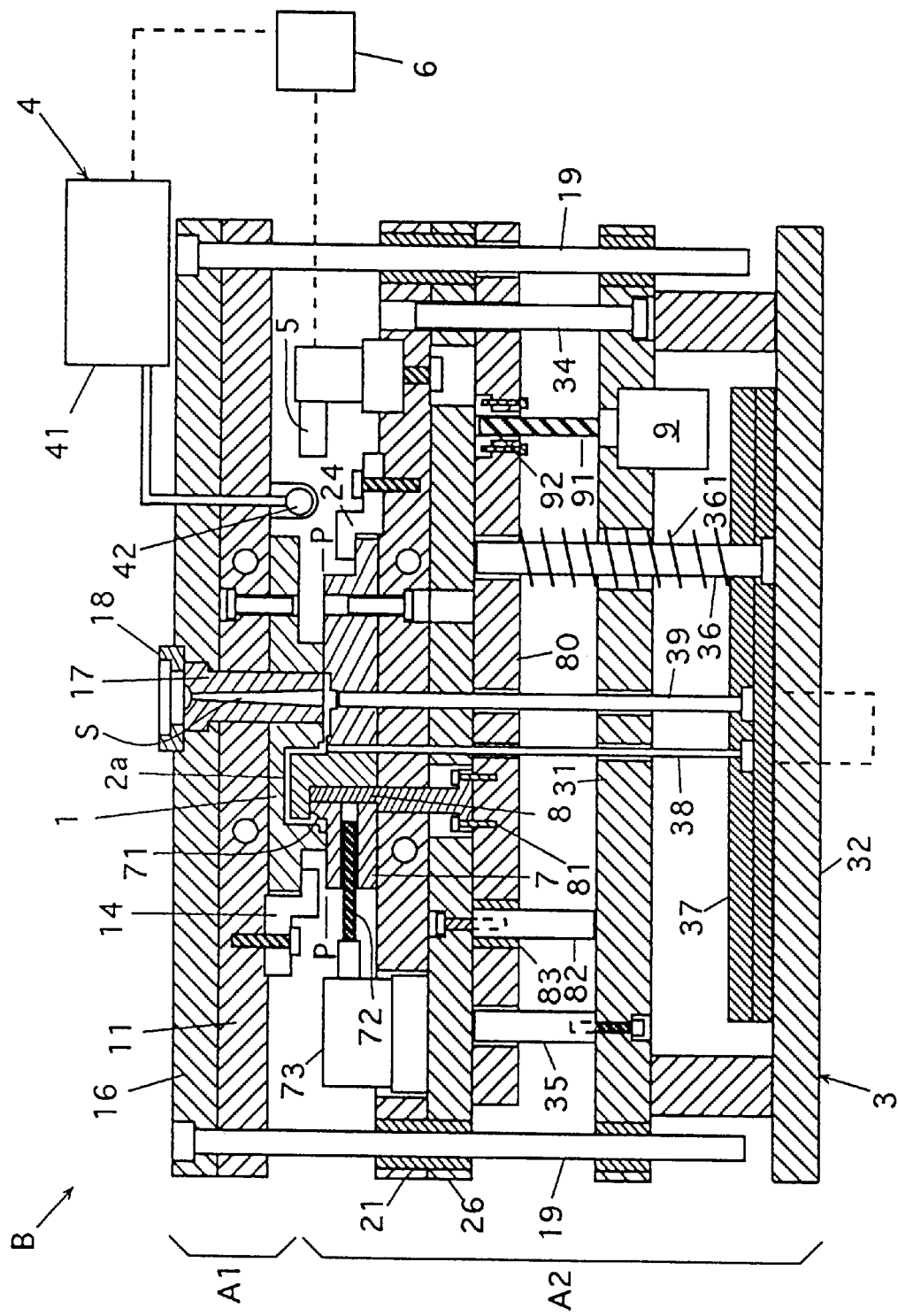
FIG. 4 is a cross section of another example of a molding die assembly according to the invention.

FIG. 3 is a cross section of a molding die assembly according to the invention, and FIG. 4 is a cross section of another molding die assembly according to the invention.

The molding die assembly in FIG. 3 is used for injection molding, and has the substantially same structure as the conventional injection-molding die assembly except for a partial structure. The die assembly A is formed of a fixed die A1 and a movable die A2.

The fixed die A1 has a cavity block 1 made of resin, and the movable die A2 has a core made of resin. Each of the cavity block 1 and core 2 is made from compound containing (1) thermoplastic resin of 40–70 weight %, (2) inorganic fiber reinforcing material of 20–40 weight % having an average fiber diameter of 5 μm or less, an aspect ratio of 3 or more and a Mohs' hardness of 6 or less, and (3) inorganic particle filler of 10–30 weight % having an average particle diameter of 20 μm or less and a Mohs' hardness of 6 or less, and has a flexural strength of 1000 kgf/cm² or more, a modulus of elasticity in bending of 70000 kgf/cm² or more and a deflection temperature under flexural load of 180° C. or more. Pellets were produced from this thermoplastic resin compound, which is the same as that already described. The pellets were extruded to form plates, which were then machined to form the cavity block 1 and core 2 having high accuracy.

In the fixed die A1, the cavity block 1 is positioned in contact with a cavity block holder 11 by a positioning pin 12 projected from the cavity block holder 11. The cavity block 1 is fixed to the holder 11 by holder members 14 which are detachably fixed to the holder 11 by screws 13. This also serves to reinforce the cavity block. The cavity block holder 11 is provided with a cooling water passage 15 for controlling a molding temperature and others. The holder 11 is fixed in contact with a fixed bottom plate 16.

A sprue bushing 17 provided with a sprue S is fitted into the fixed die A1, and is fixed by a locating ring 18 fixed to the bottom plate 16.

In the movable die A2, the core 2 is positioned in contact with a core holder 21 by a positioning pin 22 projected from the core holder 21. The core 2 is fixed to the holder 21 by holder members 24 detachably fixed to the holder 21 by screws 23. This also serves to reinforce the core. The core holder 21 is provided with a cooling water passage 25 for controlling the molding temperature and others. The holder 21 is fixed in contact with a support plate 26.

In this die assembly and other type of die assembly which will be described later, configurations and sizes of the holder members 14 and 24 may be appropriately changed to allow change in configurations and sizes of the cavity block 1 and core 2, and thus to reduce the weights and volumes of the cavity block 1 and core 2. Here, the holder members 14 and 24 may be made of any material provided that they have a strength enough to hold the cavity block 1 and core 2, and, for example, may be made of metal such as steel. Here, ordinary structural steel in a range of S15C–S45C is used.

The cooling water passages 15 and 25 in the cavity block holder 11 and core holder 21 are not essential, and can be eliminated if cooling can be sufficiently achieved by natural cooling.

Outside the support plate 26, there is arranged a movable bottom frame 3, which includes plates 31 and 32 as well as spacer blocks 33 located therebetween. A positioning pin 34 is projected from the frame 3 and is fitted into the core holder 21 for positioning the same. A height reference block 35 is projected from the plate 31 of the frame 3 for determining a height level of the core holder 21, and is in contact with the support plate 26. At position remote from the block 35, a push rod 36 is projected from the frame plate 32. The push rod 36 extends through the plate 31 and is in contact with the support plate 26. A spring 360 is fitted around the rod 36 for assisting a rising operation of the support plate 26.

The fixed die A1 is provided with guide pins 19, which are slidably fitted into guide pin bushings 191 and 192 at the movable die A2. The movable die A2 is guided by these pins and bushings to move with respect to the fixed die A1, so that the core 2 can be accurately fitted into and released from the cavity block 1. In the state shown in FIG. 3, the dies are fastened together, and the cavity block 1 and the core 2 are brought into contact with each other at a parting line P—P, so that a runner R and a gate G continuous to the sprue S are formed therebetween.

In the movable bottom frame 3, a knock-out plate 37 is arranged on the frame plate 32, and a knock-out pin 38 and a sprue lock pin 39 are projected therefrom. The pin 38 extends through the support plate 26 and the core holder 21 to the upper surface of the core 2. The sprue lock pin 39 also extends through the support plate 26 and the core holder 21 to the runner R, and is confronted with the sprue S. The knock-out plate 37 is driven by an ejector rod 30 which is a part of a molding machine.

This molding die assembly is also provided with a device 4 for ejecting cooling air to the cavity block 1 and core 2. The device 4 is formed of a pressurized cold air generating device 41, an air nozzle 42 provided at the cavity block holder 11 and a piping 43 for leading the cold air from the device 41 to the nozzle 42. In this embodiment, the pressurized cold air generating device 41 is Aeromart 90 manufactured by Mekuto Co.,Ltd., but may be another device such as Colder 190-75SV manufactured by Sanwa Enterprise Co.,Ltd. and others. The nozzle 42 includes a plurality of air injection ports for ejecting the cold air to the cavity block 1 and the core 2.

This molding die assembly is further provided with an infrared rays radiational thermometer 5 (IT2-50 manufactured by Keyence Co.,Ltd.) for detecting the temperatures of the cavity block 1 and the core 2. The thermometer 5 is arranged at the core holder 21.

It is desired that the nozzle 42 is directed mainly to portions of the cavity block 1 and core 2, which tend to be heated to a high temperature, and typically to the gate and the vicinity thereof, so that the cold air may be ejected thereto at the time of die opening, as is done in this die assembly. Molded products, as well as the cavity block and the core, can be cooled at the time of die opening by providing such the nozzle 42. It is desired that the thermometer 5 is arranged at a position which allows to detect the temperature of such hot portions, as is done in this die assembly. However, the positions of the nozzle 42 and the thermometer 5 are not restricted to those at this illustrated die assembly.

The temperature of the cavity block 1 and core 2 detected by the thermometer 5 is sent to a controller 6. The controller 6 includes a microprocessor, and controls the operation of the device 41 in accordance with the detected temperature sent thereto. The control is performed in such a manner that when the detected temperature sent thereto reaches or exceeds a predetermined reference temperature, the device 4 (more specifically, the pressurized cold air generating device 41) operates to eject the cold air from the nozzle 42 to the cavity block 1 and core 2 for a predetermined time, and then it will stop. The reference temperature is lower than the temperature of the cavity block 1 and core 2 which is detected by the thermometer 5 at the time of die opening. Accordingly, the controller 6 generally sends an instruction to the cold air ejecting device 4 to eject the cold air to the cavity block 1 and core 2 when the dies are open. By ejecting the air for the time which was determined by an experiment or the like, the detected temperature lowers to a predetermined value. The controller 6 is not restricted to the system performing the above control, but may be constructed, for example, such that, when the detected temperature is equal to or higher than predetermined first reference temperature, the device 4 is operated, and, when the detected temperature lowers to a second reference temperature lower than the first reference temperature, ejection of the cold air is stopped. In summary, it is required only to control the cooling air ejecting device 4 in accordance with the temperature detected by the thermometer 5 so that the temperature detected by the thermometer 5 satisfies the predetermined temperature condition.

According to the injection molding die assembly A described above, the molding is performed as follows. The die assembly A is assembled into an unillustrated injection molding machine, and an unillustrated injection nozzle for the molten molding material of the molding machine is positioned and connected to the sprue S by the locating ring 18 of the fixed die A1. The die assembly A is fastened as shown in FIG. 3. This fastening is performed by an unillustrated drive unit in the molding machine in such a manner that the movable bottom frame 3 is pushed toward the cavity block so that the height reference block 35 and the push rod 36 push the support plate 26, the core holder 21 and the core 2. The material injected from the molten material injection nozzle is loaded into a space defined between the cavity block 1 and the core 2 made of resin via the sprue S, runner R and gate G. The loaded material is cooled and solidified to maintain a configuration by the cooling water for temperature control flowing through the cooling water passage 15 at the cavity block holder 11 and the cooling water passage 25 at the core holder 21. Then, the frame 3 is lowered together with the core 2, and the cavity block 1 and the core 2 are separated at the parting line P—P. After this die opening, the knock-out plate 37 as well as the knock-out pin 38 and the sprue lock pin 39 supported thereby are pushed by the ejector rod 30, so that the molded product which tends to be adhere to the core 2 is separated from the core 2, and the sprue S is closed by the sprue lock pin 39.

In any of the periods before and during the molding as well as during the subsequent die opening and releasing of the product from the die, the controller 6 can send an instruction to the cooling air ejecting device 4 to eject the cold air from the nozzle 42 to cool the cavity block 1 and core 2, when the temperature detected by the thermometer 5 is equal to or higher than the reference temperature. In this embodiment, the reference temperature is determined as described before in view of the high temperature of the cavity block 1 and core 2 detected immediately after the die opening. Therefore, in the ordinary molding operation, ejection of the cooling air is instructed in accordance with the temperature detected after the die opening. Thereby, the cavity block 1 and core 2 are cooled rapidly.

After removal of the molded product, the dies are refastened together for the next molding. During this refastening, unillustrated return pins supported by the knock-out plate 37 are brought into contact with and pushed by predetermined portions of the fixed die A1, so that the knock-out pin 38 and the sprue lock pin 39 as well as the knock-out plate 37 supporting them return to the initial position.

Then, molding die assembly shown in FIG. 4 will be described below.

The molding die assembly B has a split structure and is used for molding the product which is provided at its side surface with an undercut such as an aperture, a rib or a threaded portion.

The molding die assembly B has the substantially same structure as the molding die assembly A already described except that the core 2 is replaced with a core 2a, and a slide core 7 and a slide core backup member 8 are employed. The core 2a is fixed to the core holder 21 as is done in the die assembly A. The slide core 7 has an undercut portion 71, and is positioned at a predetermined position with respect to the core 2a by the backup member 8 to form one core together with the core 2a. The slide core 7 is slidably mounted on the core holder 21, and has a screw hole engaged with a screw rod 72. The screw rod 72 can be rotated in the forward and reverse directions by an electric motor 73. The motor 73 is fitted into the core holder 21 and is supported by the support plate 26. The motor 73 can move the slide core 7 between a molding position shown in FIG. 4 and an advanced position, i.e., a die release position.

In the die assembly B, a plate-like backup member holder 80 is arranged between the support plate 26 and the movable bottom frame 3. The backup member 8 is movably fitted into the core holder 21 and the support plate 26, and is fixed to the holder 80 by screws 81.

The support plate 26 is provided with guide pin 82, which extends slidably through guide pin bushing 83 arranged at the holder 80 to the frame 3. The holder 80 can move vertically along the pin 82. Female threaded portion 92 is fixed to another portion of the holder 80, and is engaged with screw rod 91, which can be driven in the forward and reverse directions by electric motor 9 supported by the frame 3.

The height reference block 35, knock-out pin 38, sprue lock pin 39, push rod 36 and positioning pin 34 each extends through the backup member holder 80, so that the holder 80 can reciprocate between the support plate 26 and the frame 3 in accordance with rotation of the screw rod 91 driven by the motor 9. Thereby, the backup member 8 can move between the position shown in FIG. 4 for backup of the slide core 7 and the lowered position for allowing advance of the slide core 7 to the die release position. A spring 361 is fitted around the push rod 36 for assisting rising of the holder 80.

According to this die assembly B, the molding is performed as described below. Similarly to the molding with the die assembly A, the assembly B is assembled into an unillustrated injection molding machine, and an unillustrated injection nozzle for molten molding material in the molding machine is positioned by the locating ring 18 of the fixed A1, and is connected to the sprue S. Similarly to the case of the die assembly A, the die assembly B is fastened. In the die assembly B, however, the backup member 8 is raised toward the core 2a and is located at the backup position, and the slide core 7 is advanced to contact with the member 8 and thus occupies the molding position shown in FIG. 4. Then, the molding is performed similarly to the case of the die assembly A.

The molten material injected into the space between the cavity block 1 and the core solidifies to maintain its configuration. Then, the dies are opened and the product is removed as is done in the case of the die assembly A.

Based on the instruction from the controller 6, the cooling air ejecting device 4 cools the cavity block 1, core 2a and slide core 7 as well as the molded product similarly to the case of the die assembly A.

In the die assembly B, however, the motor 9 operates to lower the backup member holder 80 together with the backup member 8 prior to the die opening. Then, the motor 73 operates to advance the slide core 7 along the core holder 26 and the parting line P—P to the release position. In this manner, the slide core 7 is released from the undercut of the molded product. Subsequently, the whole movable die A2 is released from the cavity block 1 (i.e., dies are opened).

Description will now be given on experimental examples 1 and 2 of injection molding using the injection molding dies according to the invention not provided with the undercut portion as shown in FIG.3. The core and cavity block of the dies used in this experiments were made from pellets of thermoplastic resin compound having the following composition.

Polyphenylene sulfide (Fortron W300, manufactured by Polyplastic Co.,Ltd.) of 25 weight part, polyetherimide (Ultem 1010-1000, manufactured by GE Plastics Japan Ltd.) of 25 weight part, potassium titanate whisker (Tismo N-102, average fiber diameter 0.4 μm, average fiber length 14 μm, aspect ratio 35, Mohs' hardness 4, manufactured by Otsuka Chemical Co.,Ltd.) of 30 weight part, and talc (Talc MS, average particle diameter 9 μm, Mohs' hardness 1, manufactured by Nippon Talc Co.,Ltd.) of 20 weight part were kneaded and extruded by a 45 mm biaxial extruder at a cylinder temperature of 330° C. to form pellets by a cutter.

The pellets thus produced were extruded by an extruder equipped with a die for sheet of 50 mm in thickness at a cylinder temperature of 330° C. for forming blocks of 50 mm in thickness, 300 mm in width and 300 mm in length. The blocks were machined into the core and the cavity block. The block has the following physical property.

Tensile strength: 802 kgf/cm$^2$

Flexural strength: 1344 kgf/cm$^2$

Modulus of elasticity in bending: 143600 kgf/cm$^2$

EXPERIMENTAL EXAMPLE 1

Figure 5:
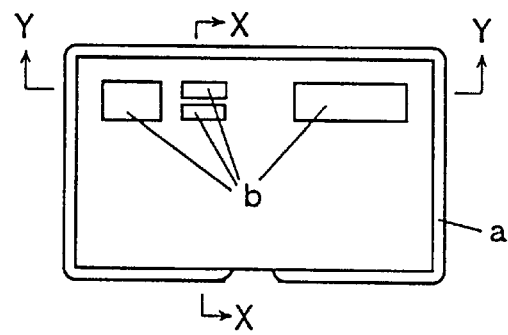
FIG. 5 is a plan showing an example of a molded product formed by injection molding with a molding die assembly according to the invention.
Figure 6:
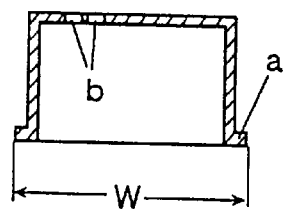
FIG. 6 is a cross section taken along line X—X in FIG. 5.
Figure 7:
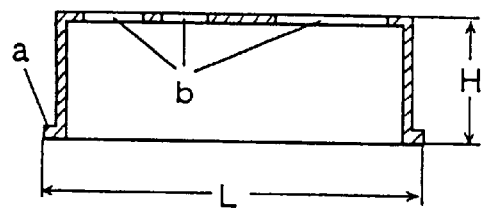
FIG. 7 is a cross section taken along line Y—Y in FIG. 5.

(1) Molded Product: a box-shaped molded product having a peripheral flange a and an apertures b at the bottom wall as shown in FIGS. 5–7

(size L=60 mm, W=30 mm, H=18 mm)

(2) Material of Molded Product: ABS resin (3) Molding Condition

Molding machine: Sumitomo Nestar 50 ton SG50

Cavity block temperature: 45° C.

Core temperature: 45° C.

Molding machine nozzle temperature: 235° C.

Cylinder front temperature: 235° C.

Cylinder middle temperature: 230° C.

Cylinder rear temperature: 200° C.

Injection volume: 20 cc/shot

Injection pressure: 1290 kgf/cm$^2$

Injection time: 1.56 seconds

Cooling time by cooling air ejection device 4:25 sec.

(4) Molding Result

The above product could be molded accurately by the continuous shot with the injection pressure of 1290 kgf/cm$^2$ and the molding cycle time of 30 seconds. In this experimental example, the cooling effect of the cavity block and core by ejection of the cooling air was confirmed.

(5) Machining Condition and Required Machining Time of the Resin Compound for Molding Die

|  | Fixed Cavity | Movable Core |
| --- | --- | --- |
| Tool | flat end mill of 2 mm in dia. | flat end mill of 2 mm in dia. |
| Rotation Speed | 3500 rpm | 3500 rpm |
| Feed Speed | 400–500 mm/min (manual feed) | 1260 mm/min |
| Cutting Depth | 2 mm | 0.02 mm |
| Total Machining Time | approx.153 min. | approx.237 min. |

As described above, the cavity block and core could be manufactured only by the machining in a relatively short time.

EXPERIMENTAL EXAMPLE 2

Figure 8:
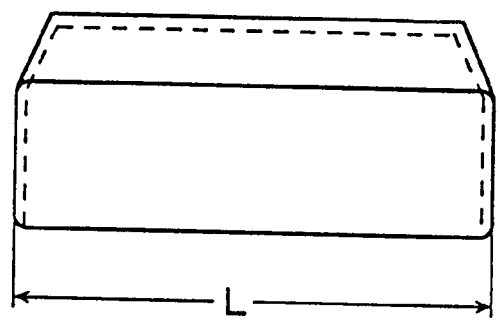
FIG. 8 is an elevation of another example of a molded product formed by injection molding with a molding die assembly according to the invention.
Figure 9:
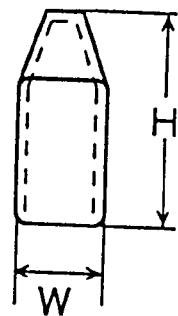
FIG. 9 is a side view of a molded product shown in FIG. 8.

(1) Molded Product: A product having an outer peripheral configuration and a wall of an entirely uniform thickness forming an internal space as shown in FIGS. 8 and 9

(Size L=34 mm, W=15 mm, H=25.5 mm)

(2) Material of Molded Product: Wax (3) Molding Condition

Molding machine: Wax Injector

Cavity block temperature: 14° C.

Core temperature 14° C.

Machine nozzle temperature: 90° C.

Injection pressure: 50 kgf/cm$^2$

Injection time: 60 seconds (4) Molding Result

The above product could be molded accurately by the continuous shot with the injection pressure of 50 kgf/cm$^2$ and the molding cycle time of 60 seconds.

(5) Machining Condition and Required Machining Time of the Resin Compound for Molding Die Fixed cavity block is finished with a depth of 6 mm.

Movable core is finished with a stepped portion for a head attachment

|  | Fixed Cavity | Movable Core |
| --- | --- | --- |
| Tool | ball end mill of 2 mm in dia. | flat end mill of 2 mm in dia. |
| Rotation Speed | 3500 rpm | 3000 rpm |
| Feed Speed | 180 mm/min | 180 mm/min |
| Cutting Depth | 0.051 mm | 0.1 mm |
| Total Machining Time | approx. 15 min. | approx. 5 min. |

As described above, the cavity block and core could be manufactured only by the machining within a relatively short time.

Figure 10:
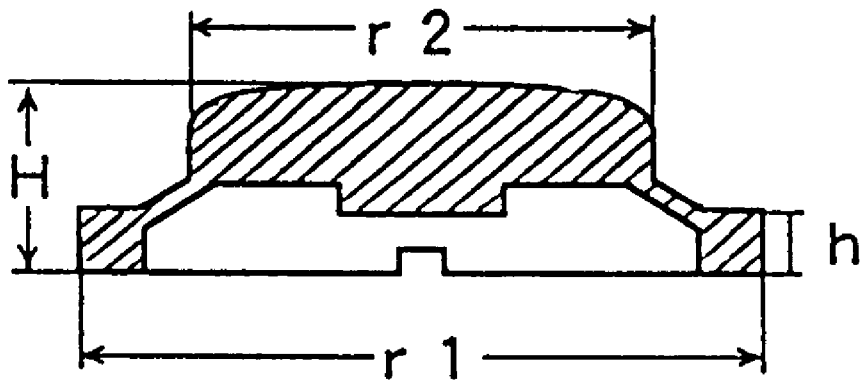
FIG. 10 is a cross section of still another example of a molded product formed by injection molding with a molding die assembly according to the invention.

Then, description will be given on an experimental example 3 of manufacturing the cavity block and core for producing a molded product having a circular shape in a plan view as shown in FIG. 10 (size r1=9 mm, r2=6.5 mm, H=2.8 mm, h=0.95 mm).

EXPERIMENTAL EXAMPLE 3

This experimental example shows an example of time for three-dimensional machining.

(1) Machining Condition and Required Time of the Resin Compound for Molding Die (Cavity Block Machining)

Rough Machining

Tool: 2-blade carbide solid end mill of 3 mm in dia.

Machining Speed 80 mm/min
Spindle Speed: 8500 rpm
Feed Speed: 1500 mm/min
Cutting Depth: 0.09 mm
Inclined Portion
Tool: 2-blade carbide solid end mill of 3 mm in dia.
Machining Speed 80 mm/min
Spindle Speed: 8500 rpm
Feed Speed: 1500 mm/min
Cutting Depth: 0.09 mm
Bottom
Tool: 2-blade carbide ball end mill of 3 mm in dia.
Machining Speed 80 mm/min
Spindle Speed: 8500 rpm
Feed Speed: 1500 mm/min
Cutting Depth: 0.09 mm
(Core Machining)
Rough Machining (2 mm in diameter and 1.5 mm in width)
Tool: 2-blade carbide solid end mill of 3 mm in dia.
Machining Speed 80 mm/min
Spindle Speed: 8500 rpm
Feed Speed: 1500 mm/min
Cutting Depth: 0.09 mm and
Tool: 2-blade carbide solid end mill of 1.5 mm in dia.
Machining Speed 56 mm/min
Spindle Speed: 12000 rpm
Feed Speed: 20/300 mm/min
Cutting Depth: 0.01 mm
Inclined Portion (groove of 2 mm in width)
Tool: 2-blade carbide ball end mill of 1 mm in dia.
Machining Speed 37 mm/min
Spindle Speed: 12000 rpm
Feed Speed: 750 mm/min
Cutting Depth: 0.03 mm
R1 Groove
Tool: 2-blade carbide ball end mill of 2 mm in dia.
Machining Speed 75 mm/min
Spindle Speed: 12000 rpm
Feed Speed: 650 mm/min
Cutting Depth: 0.02 mm
Bottom
Tool: 2-blade carbide solid end mill of 1 mm in dia.
Machining Speed 37 mm/min
Spindle Speed: 12000 rpm
Feed Speed: 600 mm/min
Cutting Depth: 0.02 mm
(2) Machining Time

|  | Actual Machining Time (min) |
| --- | --- |
| Cavity Block Machining | 3.56 |
| Core Machining | 19.06 |
| Total | 22.60 |

From the above experiment, it was confirmed that the cavity block and core could be completed to be produced only within a time of about 10 hours including the time for programming and measuring.

As described above, it can be understood that the cavity block and core made of the resin according to the invention can be machined within a relatively short time, so that the invention can effectively reduce the number of manufacturing steps, the manufacturing term, the cost and others in trial manufacturing of the molded product and manufacturing of small number of parts.

Figure 11:
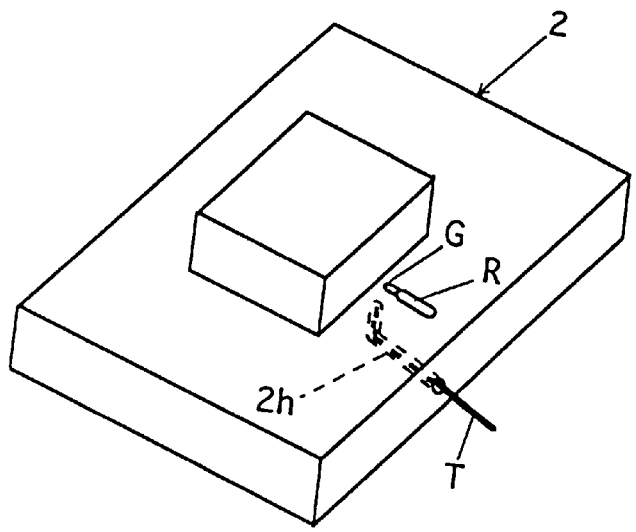
FIG. 11 is a perspective view showing another example of arrangement of temperature detecting means with respect to a core according to the invention.

The molding die of the invention is not restricted to the foregoing, and may take various forms. For example, as the means for detecting the temperature of at least one of the cavity block and core, the core 2 may be provided with a temperature-detecting-means-insert-aperture 2h, into which a temperature detecting end T of, e.g., a thermocouple thermometer is inserted for detecting the temperature at the vicinity of the gate G of the core 2 as shown in FIG. 11.

Figure 12:
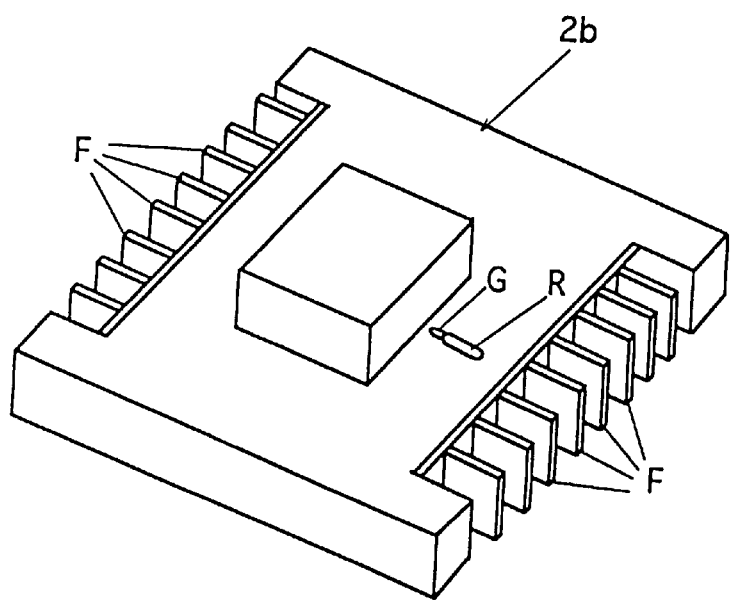
FIG. 12 is a perspective view of another example of a core according to the invention.

As the cooling means for the cavity block and core, heat-radiation fins F made of metal may be formed at the core 2b instead of or together with the cooling air ejecting device 4 as shown in FIG. 12. In this example, the surface of the core are metal-plated for improving the effect of transferring heat to the heat-radiation fins F. Likewise, the cavity block may be provided with the heat-radiation fins (and metal plated). If the cooling air ejecting device 4 can be eliminated owing to provision of the heat-radiation fins F, the whole structure of the die assembly can be simplified, and the cost can be reduced, which is suitable to trial manufacturing and experiment in the laboratory.

Description will be given on an experimental example 4 for evaluating durability of molding dies (core and cavity block) produced from the resin compound according to the invention, an experimental example 5 of rubber compression molding by the molding dies (core and cavity block) produced from the resin compound according to the invention, and an experimental example 6 of the casting with the molding dies (core and cavity block) produced from the resin compound according to the invention.

EXPERIMENTAL EXAMPLE 4

Durability of Molding Dies

Resin compound containing materials in the embodiment 3, of which quantity ratio is shown in the table 1 already described, was used, and pellets of this resin compound were produced similarly to the cases of the experimental examples 1 and 2. Blocks were formed from these pellets, and were machined to form the molding dies (core and cavity block) for injection-molding the molded product shown in FIGS. 5–7.

The molding dies were covered with nickel-phosphorus plating of 20 $\mu$m in thickness under the following condition.

| Plating Conditions Step | Time | Temp. | Chemicals (tm:trade name) |
| --- | --- | --- | --- |
| Cleaning | 10 min | 50° C. | C-4000 (tm) 50 g/l |
| Acid washing | 20 sec | 25° C. | 35% hydrochloric acid 100 ml/l |
| Preetching | 5 min | 45° C. | N,N-dimethylformamide 700 ml/l |
| Etching | 10 min | 45° C. | nitric acid 700 ml/l + acid ammonium fluoride 150 g/l |
| Conditioner | 5 min | 60° C. | CD-202 (tm) 50 g/l |
| Predip | 1 min | 25° C. | PED-104 (tm) 270 g/l |
| Catalyst | 5 min | 25° C. | AT-105 (tm) 30 ml/l |
| Accelerator | 4 min | 25° C. | 35% hydrochloric acid 100 ml/l |

-continued

| Plating Conditions Step | Time | Temp. | Chemicals (tm:trade name) |
|---|---|---|---|
| Drying | | 80° C. | |
| Electroless Nickel | 140 min | 90° C. | Nimuden LPX Standard Bath (tm) |
| Heat Treatment | | 150° C. | |

In each stage between the steps, rinsing was performed sufficiently. Among the above chemicals, those bearing the trade names are manufactured by Uemura Kogyo Co.,Ltd.

Injection molding was performed with the above molding dies made of resin. The result is shown in the following table 6.

TABLE 6

| Material | Number of Shots (total) | Conditions |
|---|---|---|
| OA-20 (tm) | 66 (66) | Machine: 50 ton<br>Cylinder Temp.: 195° C.<br>Intermediate Time: 45 sec<br>Cycle Time: 60 sec<br>Mother Die: water cooling |
| ABS resin | 308 (374) | Machine: 50 ton<br>Cylinder Temp.: 230° C.<br>Intermediate Time: 70 sec<br>Cycle Time: 80 sec<br>Mother Die: water cooling |
| OA-30HF (tm) | 105 (479) | Machine: 75 ton<br>Cylinder Temp.: 180° C.<br>Intermediate Time: 75 sec<br>Cycle Time: 104 sec<br>Mother Die: water cooling |
| OA-30HF (tm) | 295 (774) | Cylinder Temp.: 180° C.<br>Intermediate Time: 75 sec<br>Cycle Time: 104 sec<br>Mother Die: water cooling |
| OA-30HF (tm) | 230 (1004) | Cylinder Temp.: 180° C.<br>Intermediate Time: 75 sec<br>Cycle Time: 104 sec<br>Mother Die: water cooling |
| CT-132B (tm) | 50 (1054) | Machine: 75 ton<br>Cylinder Temp.: 285° C.<br>Intermediate Time: 75 sec<br>Cycle Time: 104 sec<br>Mother Die: water cooling |
| CT-132B (tm) | 150 (1204) | Cylinder Temp.: 285° C.<br>Intermediate Time: 75 sec<br>Cycle Time: 104 sec<br>Mother Die: water cooling |

In the above table 6, details of the injection-molded material are as follows.

ABS resin: trade name Styluck AT-10 manufactured by Asahi Chemical Industry Co.,Ltd.

OA-20: resin compound (manufactured by Otsuka Chemical Co.,Ltd.) containing polyacetal resin and potassium titanate whiskers (trade name:Timos D manufactured by Otsuka Chemical Co.,Ltd.) of 20 Wt %

OA-30HF: resin compound (manufactured by Otsuka Chemical Co.,Ltd.) containing polyacetal resin and potassium titanate whiskers (trade name:Timos D manufactured by Otsuka Chemical Co.,Ltd.) of 30 wt %

CT132B: resin compound (manufactured by Otsuka Chemical Co.,Ltd.) containing polycarbonate resin and potassium titanate whiskers (trade name: Timos N manufactured by Otsuka Chemical Co.,Ltd.) of 15 wt %

It can be understood from the above result that the resin molding dies of the invention can be sufficiently used for injection molding of polycarbonate requiring an especially high molding temperature among general-purpose engineering plastics.

After the above injection molding, the molding dies made of resin according to the invention were observed to find that no prominent damage was found, from which it can be understood that the molding die of the invention can be used for mass production of plastic molded products.

EXPERIMENTAL EXAMPLE 5

Compression Molding of Rubber

Figure 13:
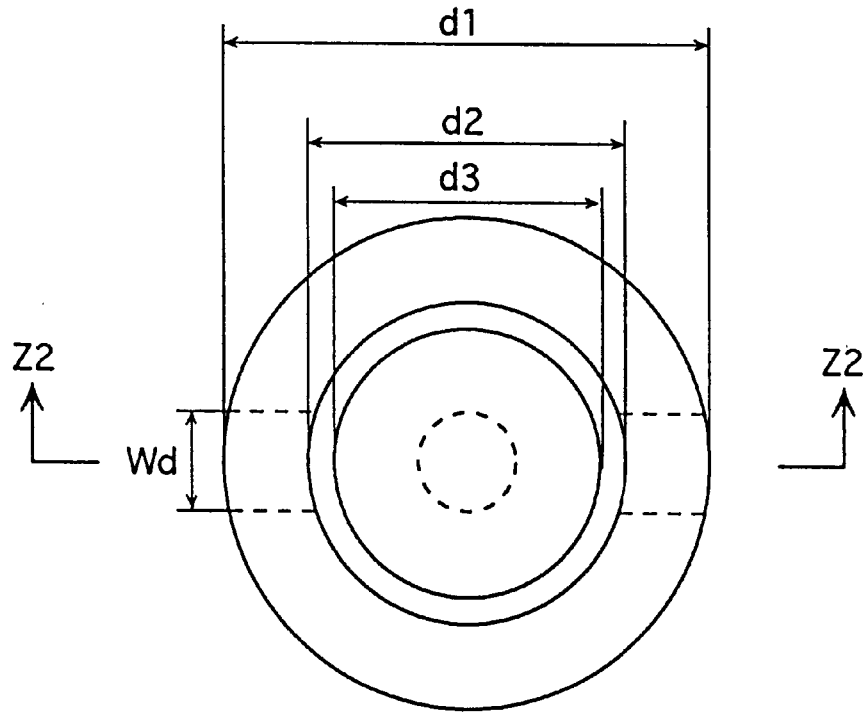
FIG. 13 is a plan showing an example of a rubber molded product formed by compression molding with a molding die assembly according to the invention.
Figure 14:
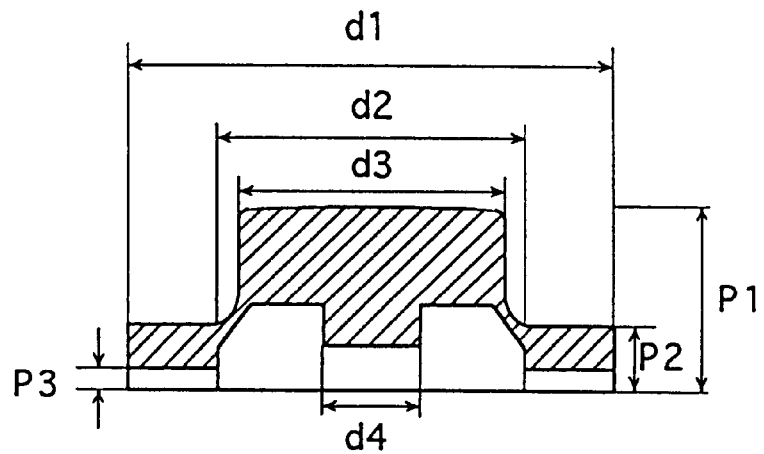
FIG. 14 is a cross section taken along line Z2—Z2 in FIG. 13.
Figure 15:
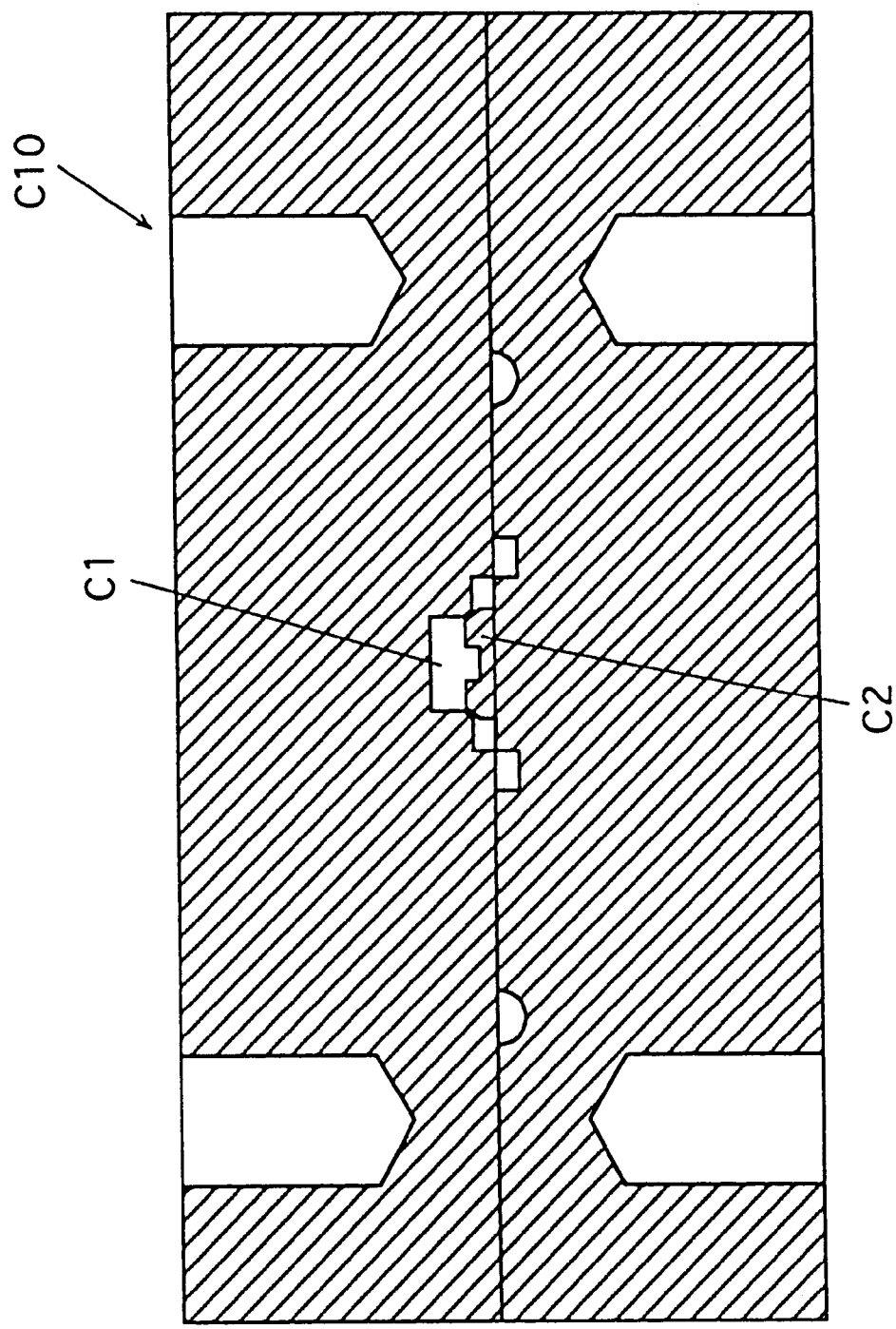
FIG. 15 is a cross section of a molding die according to the invention for compression molding of a molded product shown in FIGS. 13 and 14.

Blocks were produced from resin compound containing materials in the embodiment 1, of which quantity ratio is shown in the table 1 already described, by the processing similar to that in the embodiment 1, and then were machined to produce resin dies C10 shown in FIG. 15 for molding a product shown in FIGS. 13 and 14. Machining of a cavity block C1 and a core C2 made of the resin takes only the time of 3 minutes and 30 seconds and the time of 19 minutes and 04 seconds, respectively. The resin dies thus produced were covered with nickel-phosphorus plating similarly to the experimental example 4.

The molded product and molding condition are as follows.

(1) Molded Product: A product having a circular shape in a plan view and having a bottom flange provided with a pair of grooves as shown in FIGS. 13 and 14.

| size | d1 = 9 mm, d2 = 6.56 mm, d3 = 5.6 mm,<br>d4 = 2 mm, P1 = 2.8 mm, P2 = 0.95 mm<br>groove depth P3 = 0.3 mm, groove width Wd = 1.5 mm |
|---|---|

(2) Material of Molded Product: natural rubber (NBR, oil resistant), hardness 70

(3) Molding Condition
    Molding Machine: hydraulic press (manufactured by Kotaku Seisakusho) 70 ton
    Molding Pressure: 200 kgf/cm$^2$, deaerated 4 times
    Molding Temperature and Time: 160° C.×150 sec, or 170° C.×180 sec As a result of the molding, the molded product of natural rubber could have intended configuration and size.

EXPERIMENTAL EXAMPLE 6

Casting

Blocks were produced from resin compound containing materials in the embodiment 3, of which quantity ratio is described in the table 1 already described, by the processing similar to that in the embodiment 3, and then were machined to produce resin dies for casting a product described below, and the casting was performed with these dies under the following conditions.

TABLE 7

| (Cavity Block Portion) |
|---|
| Rough Machining |
| Tool: ball end mill of 6 in dia.<br>Spindle Speed: 3500 rpm |

TABLE 7-continued

Feed Speed: 400 mm/min
Cutting Depth: 2 mm
Semi-finishing

Tool: ball end mill of 6 in dia.
Spindle Speed: 4000 rpm
Feed Speed: 600 mm/min
Cutting Depth: 1 mm
Finishing Tool: ball end mill of 4 in dia.
Spindle Speed: 4500 rpm
Feed Speed: 800 mm/min
Cutting Depth: 0.3–0.5 mm
(Core Portion)

Rough Machining

Tool: flat end mill of 10 in dia.
Spindle Speed: 3500 rpm
Feed Speed: 540 mm/min
Cutting Depth: 2 mm
Finishing (side wall)

Tool: flat end mill of 4 in dia.
Spindle Speed: 4500 rpm
Feed Speed: 1000 mm/min
Cutting Depth: 0.1 mm
Finishing (top surface)

Tool: ball end mill of 4 in dia.
Spindle Speed: 4500 rpm
Feed Speed: 1000 mm/min
Cutting Depth: 0.15 mm (1) Molded Product: resin case (box), size 90 mm × 60 mm × 25 mm average thickness 2 mm
(2) Material of Molded Product: two-part urethane resin
(3) Molding Machine: vacuum casting machine (trade name: vacuum casting machine 6432, manufactured by Nogi Seisakusho Co., Ltd.)
(4) Molding Pressure: −760 mmHg
(5) Hardening Temperature and Time 60–65° C., 45 min.

After completion of casting, the dies were put in an oven for curing the resin with the above curing temperature and time to manufacture the molded product. The molded product had the intended configuration and size.

INDUSTRIAL APPLICABILITY

The resin compound of the invention can be employed for the molding dies used for material molding, and in particular for the core, cavity block or the like thereof, and the molding die formed of the compound can be applied to various methods of molding various kinds of materials.

We claim:

1. Resin compound for a molding die consisting essentially of 40–70 weight % of thermoplastic resin, 20–40 weight % of inorganic fiber reinforcing material having an average fiber diameter of 5 $\mu$m or less, an aspect ratio of 3 or more and a Mohs' hardness of 6 or less, and 10–30 weight % of inorganic particle filler having an average particle diameter of 20 $\mu$m or less and a Mohs' hardness of 6 or less, said resin compound having a flexural strength of 1000 kgf/cm$^2$ or more and a modulus of elasticity in bending of 70000 kgf/cm$^2$ or more, and said resin compound allowing machining, said inorganic fiber reinforcing material being at least one material selected from the group consisting of whiskers of potassium titanate, calcium silicate, magnesium borate, magnesium sulfate, calcium sulfate, calcium carbonate and aluminum borate, said inorganic particle filler being at least one material selected from the group consisting of talc, calcium carbonate and calcium pyrophosphate.

2. Resin compound for a molding die according to claim 1, wherein said compound has a deflection temperature under flexural load of 180° C. or more.

3. Resin compound for a molding die according to claim 2, wherein said inorganic fiber reinforcing material is potassium titanate whiskers.

4. A molding die having a core and a cavity block made of the resin compound for a molding die according to any one of the preceding claims 1, 2 or 3.

5. A method of making a molded product, which method comprises introducing a molding material into the molding die according to claim 4 to form the molded product.

6. A method of making a molded product, which method comprises introducing a molding material into the molding die of claim 4 to form the molded product by injection molding, casting, blow molding or wax molding.

7. A molding die assembly comprising a core made of resin and a cavity block made of resin, core holding means for holding said core, cavity block holding means for holding said cavity block, temperature detecting means for detecting a temperature of at least one of said core and said cavity block, means for ejecting a cooling gas to said core and said cavity block, and a controller for controlling operation of said gas ejecting means in accordance with the temperature detected by said temperature detecting means so that the temperature detected by said temperature detecting means may satisfy a predetermined temperature condition, said core and said cavity block being formed of machinable thermoplastic resin compound consisting essentially of 40–70 weight % of thermoplastic resin, 20–40 weight % of inorganic fiber reinforcing material having an average fiber diameter of 5 $\mu$m or less, an aspect ratio of 3 or more and a Mohs' hardness of 6 or less, and 10–30 weight % of inorganic particle filler having an average particle diameter of 20 $\mu$m or less and a Mohs' hardness of 6 or less, said resin compound having a flexural strength of 1000 kgf/cm$^2$ or more and a modulus of elasticity in bending of 70000 kgf/cm$^2$ or more, and said resin compound allowing machining, said inorganic fiber reinforcing material beina at least one material selected from the group consisting of whiskers of potassium titanate, calcium silicate, magnesium borate, magnesium sulfate, calcium sulfate, calcium carbonate and aluminum borate, said inorganic particle filler being at least one material selected from the group consisting of talc, calcium carbonate and calcium pyrophosphate.

8. A molding die assembly according to claim 7, wherein said thermoplastic resin compound has a deflection temperature under flexural load of 180° C. or more.

9. A molding die assembly according to claim 8, wherein said inorganic fiber reinforcing material in said thermoplastic resin compound is potassium titanate whiskers.

10. A molding die assembly comprising a core made of resin and a cavity block made of resin, core holding means for holding said core, and cavity block holding means for holding said cavity block, said core and said cavity block being formed of machinable thermoplastic resin compound consisting essentially of 40–70 weight % of thermoplastic resin, 20–40 weight % of inorganic fiber reinforcing material having an average fiber diameter of 5 $\mu$m or less, an aspect ratio of 3 or more and a Mohs' hardness of 6 or less, and 10–30 weight % of inorganic particle filler having an average particle diameter of 20 $\mu$m or less and a Mohs' hardness of 6 or less, said resin compound having a flexural strength of 1000 kgf/cm$^2$ or more and a modulus of elasticity in bending of 70000 kgf/cm$^2$ or more, and said resin compound allowing machining, said inorganic fiber reinforcing material being at least one material selected from the group consisting of whiskers of potassium titanate, calcium silicate, magnesium borate, magnesium sulfate, calcium sulfate, calcium carbonate and aluminum borate, said inorganic particle filler being at least one material selected from the group consisting of talc, calcium carbonate and calcium pyrophosphate.

11. A molding die assembly according to claim 10, wherein said thermoplastic resin compound has a deflection temperature under flexural load of 180° C. or more.

12. A molding die assembly according to claim 11, wherein said inorganic fiber reinforcing material in said thermoplastic resin compound is potassium titanate whiskers.

13. A method for producing a molded product, which method comprises introducing a molding material into the molding die according to any one of the preceding claims 7, 8, 9, 10, 11 or 12 to form the molded product.

14. A method for producing a molded product, which method comprises introducing a molding material into the molding die assembly according to any one of the preceding claims 7, 8, 9, 10, 11 or 12 to form the molded product by injection molding.

* * * * *